United States Patent
Lee et al.

(10) Patent No.: US 7,660,372 B2
(45) Date of Patent: Feb. 9, 2010

(54) EFFICIENT HEADER ACQUISITION

(75) Inventors: Jind-Yeh Lee, Irvine, CA (US); Tommy Yu, Anaheim, CA (US); Alan Kwentus, Coto de Caza, CA (US)

(73) Assignee: Broadcom Corporation, Irvine, CA (US)

( * ) Notice: Subject to any disclaimer, the term of this patent is extended or adjusted under 35 U.S.C. 154(b) by 545 days.

(21) Appl. No.: 11/054,652

(22) Filed: Feb. 9, 2005

(65) Prior Publication Data

US 2006/0176984 A1 Aug. 10, 2006

(51) Int. Cl.
*H03D 3/24* (2006.01)

(52) U.S. Cl. .................. 375/343; 375/241; 375/240.23; 375/240.27; 375/240.21

(58) Field of Classification Search ................ 375/133, 375/137, 142–143, 145, 152, 240.28, 241, 375/240.27, 240.23, 253, 254, 278, 284–285, 375/343, 355, 357, 149–150
See application file for complete search history.

(56) References Cited

U.S. PATENT DOCUMENTS

| 4,599,732 | A | * | 7/1986 | LeFever | 375/346 |
| 5,737,361 | A | * | 4/1998 | Park et al. | 375/149 |
| 5,748,686 | A | * | 5/1998 | Langberg et al. | 375/367 |
| 6,175,560 | B1 | * | 1/2001 | Bhagalia et al. | 370/342 |
| 2002/0061054 | A1 | * | 5/2002 | Boloorian | 375/149 |
| 2005/0089083 | A1 | * | 4/2005 | Fisher et al. | 375/130 |

* cited by examiner

*Primary Examiner*—Shuwang Liu
*Assistant Examiner*—Kabir A Timory
(74) *Attorney, Agent, or Firm*—Garlick Harrison & Markison; William W. Kidd

(57) ABSTRACT

In an integrated satellite receiver, improved header acquisition techniques are described for quickly locating a header symbol sequence in a data stream substantially implemented on a single CMOS integrated circuit. To identify the location of a header symbol sequence in a data stream, a selected header acquisition technique employs a real time correlator followed by an accumulator. Once accumulation over a predetermined number of frames is finished, the largest or maximum value among the accumulated correlator values is identified. If the maximum value exceeds a threshold, it will be declared as a peak and the address associated is the peak timing.

12 Claims, 5 Drawing Sheets

EFFICIENT HEADER ACQUISITION

BACKGROUND OF THE INVENTION

1. Field of the Invention

The present invention is directed in general to communication systems. In one aspect, the present invention relates to a method and system for achieving header acquisition during signal reception.

2. Related Art

In recent years, transmission of data via satellite has increased considerably. Recently, the number of personal satellite receivers has also been increasing. As large satellite receiving antennas and expensive receivers are replaced by smaller and less expensive equipment, the demand for such systems continues to rise. As the demand for satellite communication systems rises, systems which have increased performance have a distinct market advantage. Improving designs and increasing the level of system integration within satellite receivers can offer the dual benefits of decreasing system costs and increasing performance.

An example of such a design improvement area is the acquisition and synchronization of a received signal at a receiver. Conventional receivers typically synchronize with a received signal using correlator-based approaches to identify a peak correlator value based on a comparison of stored training sequence symbols with received header symbols contained in a single frame of data, where the process may be repeated with one or more frames to confirm the peak value by re-generating the peak value. Such receivers may not perform adequately in noisy environments. In addition to the complexity of circuit design requirements for receiving, demodulating, detecting and synchronizing with a data stream, the ever-increasing need for higher speed communications systems imposes additional performance requirements and resulting costs for communications systems. In order to reduce costs, communications systems are increasingly implemented using Very Large Scale Integration (VLSI) techniques. The level of integration of communications systems is constantly increasing to take advantage of advances in integrated circuit manufacturing technology and the resulting cost reductions. This means that communications systems of higher and higher complexity are being implemented in a smaller and smaller number of integrated circuits.

Accordingly, an improved method and system for acquisition and synchronization of a received signal at a receiver are needed that are economical in resources and that may be integrated in a single chip receiver, such as in a satellite communication systems. Further limitations and disadvantages of conventional systems will become apparent to one of skill in the art after reviewing the remainder of the present application with reference to the drawings and detailed description which follow.

SUMMARY OF THE INVENTION

In one aspect of the present invention, a method and system are disclosed for achieving improved header acquisition performance in a noisy environment by accumulating correlator values over a plurality of data frames. Furthermore, in a selected embodiment, the memory storage requirements may be greatly reduced by using a combination of a real-time correlator and a comparator to fill an address memory with addresses for a predetermined number of the top correlator values, and then accumulating the correlator value of each address in the address memory over a predetermined number of data frames to determine if the largest accumulated value exceeds a predetermined threshold and may be treated as a peak value for signal acquisition and synchronization purposes. While the present invention has a variety of digital receiver applications, an illustrative implementation includes is a satellite communication receiver that includes a demodulator, FEC decoder and receiver processor all integrated together on a common semiconductor substrate. In this implementation, the demodulator generates a data symbol stream from a received signal which includes plurality of symbol frames, and the receiver processor identifies the location of a predetermined header symbol sequence in the symbol frames by applying a multiple symbol frames to a real-time correlator. The correlator sequentially convolves the data symbol stream with a locally-stored training sequence of symbols to generate sequentially convolved correlator values for the symbol positions in each symbol frame. An accumulator accumulates one or more of these correlator values in a first memory to identify a peak address corresponding to the predetermined header sequence of symbols within the symbol frames. In a selected embodiment, the receiver processor determines which correlator values are to be accumulated by using the correlator to generate a first plurality of correlator values, and then using a comparator to identify the highest N correlator values from the first plurality of correlator values. The timing addresses corresponding to the highest N correlator values may be stored in an address memory, and when the address memory is full, the stored timing addresses are used to control the accumulation of the predetermined correlator values in the first memory. Once the accumulation operations are complete, the receive processor identifies a peak address corresponding to the location of a predetermined header symbol sequence by identifying a timing address in the first memory having the highest correlator value meeting or exceeding a predetermined threshold requirement.

In accordance with various embodiments of the present invention, a method and apparatus provide an improved technique for identifying a location of a predetermined data sequence (e.g., a header) in a data stream (e.g., a symbol stream) by correlating the data stream with a locally-stored training sequence over two or more predetermined segments (e.g., symbol frames) of the data stream to generate a correlator value for each position in the data stream. By accumulating the correlator values for a plurality of positions in a plurality of the data stream segments, a peak correlator value can be identified from the accumulated correlator values, and its corresponding timing address value can be used to identify the location of the predetermined data sequence in the data stream. In addition or in the alternative, a predetermined threshold requirement may be applied to the largest accumulated correlator value for purposes of identifying the peak correlator value. If correlator values are accumulated for each and every position in the predetermined segment, then a relatively large memory may be required to store the accumulation results. On the other hand, the memory requirements may be reduced by accumulating correlator values for only predetermined positions in the predetermined segment of the data stream, where the predetermined positions are the positions corresponding to the top ranked correlator values. For example, a comparator may be used to pick out the top N correlator values, the corresponding N timing addresses may be stored in an address memory and used to identify which positions in the predetermined segment of the data stream are accumulated.

The objects, advantages and other novel features of the present invention will be apparent to those skilled in the art from the following detailed description when read in conjunction with the appended claims and accompanying drawings.

DETAILED DESCRIPTION

A method and apparatus are described for providing efficient header acquisition in noisy environments with reduced memory requirements. While various details are set forth in the following description, it will be appreciated that the present invention may be practiced without these specific details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the art to describe and convey the substance of their work to others skilled in the art. Unless specifically stated otherwise as apparent from the following discussion, it is appreciated that throughout the description, discussions using terms such as processing, computing, calculating, determining, displaying or the like, refer to the action and processes of a computer system, or similar electronic computing device or circuit, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
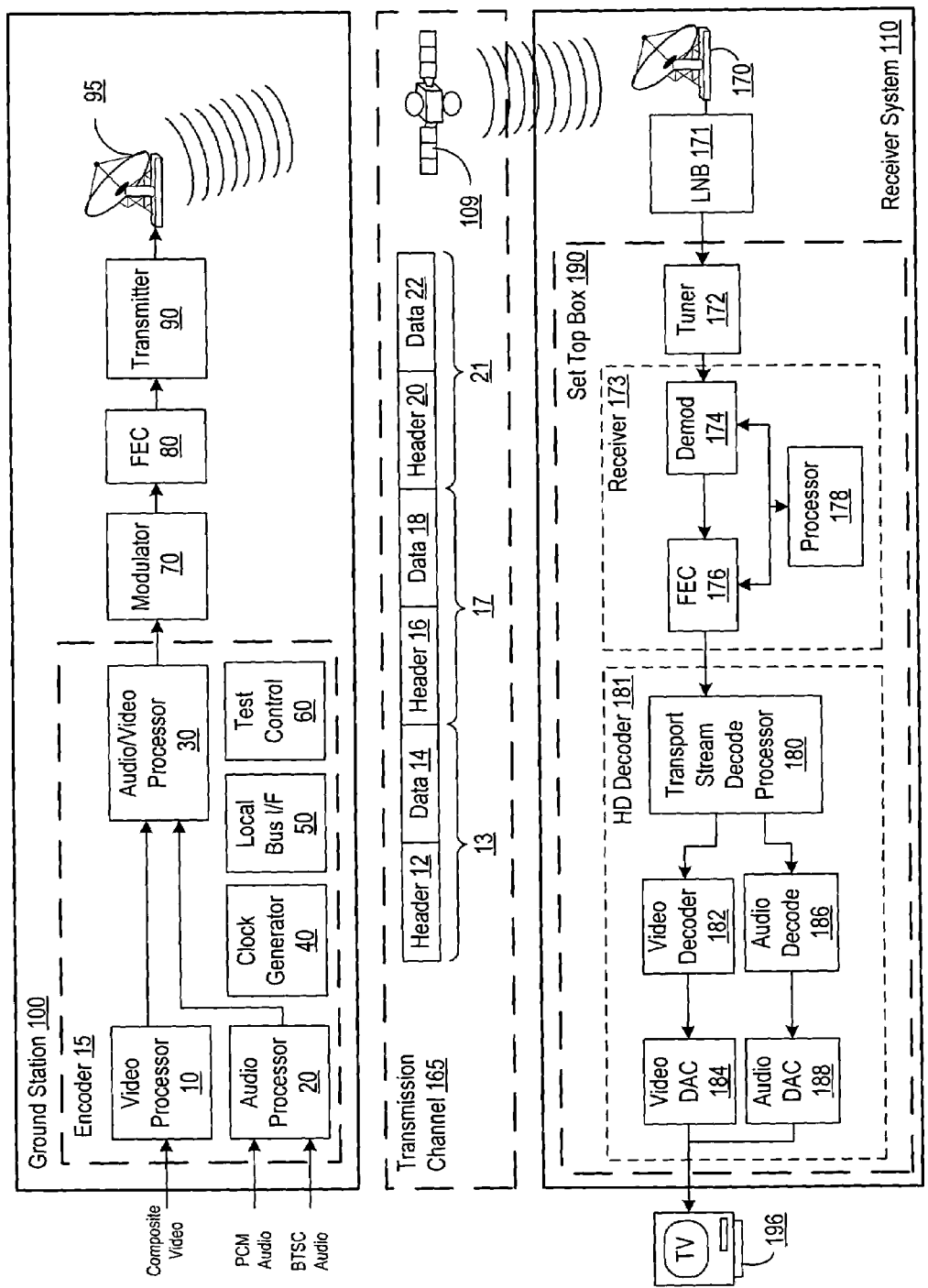
FIG. 1 illustrates an example environment in which embodiments of the present invention may operate.

A selected embodiment of the present invention is shown in FIG. 1, which depicts a graphical representation of an example environment, in which the described exemplary satellite communication system may operate. Within the environment of FIG. 1, audio and/or video signals are compressed and encoded at a ground station 100, which then broadcasts the data to a satellite 109. The satellite in turn re-broadcasts the data to a receiver system 110 thereby providing it to a user device 196. Although the described exemplary embodiments disclosed herein are directed to direct broadcast satellite systems, the present invention is not necessarily limited to the example embodiments which illustrate inventive aspects of the present invention that are applicable to a wide variety of electronic systems.

In the illustrative communications network depicted in FIG. 1, the audio and video streams for a program are separately encoded by encoder 15 to produce compressed audio and video streams, which are referred to as elementary streams. As illustrated, the encoder 15 includes a video processor 10 which receives the composite video. The digitized video signal input is processed by video processor 10 and provided as an output to an audio/video processor 30. An audio processor 20 receives and encodes PCM and BTSC audio signals and provides an output to the audio/video processor 30. The encoder 15 also includes other function circuit units, including a CLK generator 40, a local bus interface 50, and a test control portion 60.

The compressed audio and video data streams (such as a television cable signal, music channel or Internet data streams) are provided by the encoder 15 to a modulator 70 and forward error correction unit (FEC) 80. Within the modulator 70 and FEC 80, the data is modulated on one or more carrier waveforms by translating the data from data source into a form suitable for transmission. The modulated data is further coupled to a transmitter 90 where the data may be further amplified and coupled, for example, to a dish antenna 95

The data may then be transmitted over a transmission channel 165 via the satellite 109. Alternatively, the transmission channel 165 may be a telephone network, a cable television network, a computer data network, a terrestrial broadcast system, or some combination thereof. As such, the transmission channel may include RF transmitters, satellite transponders, optical fibers, coaxial cables, unshielded twisted pairs of wires, switches, in-line amplifiers, etc. The satellite 109 accepts data transmitted from dish antenna 95, and then amplifies and rebroadcasts the data to the receiver system 110 on earth.

At the receiver system 110, a user antenna 170 receives the data transmission signal from the satellite 109. At the low noise block (LNB) 171, the received signal is amplified and provided to a set top box 190. Within the set top box 190, the received signal is demodulated and converted by the receiver 173 and decoder 181 into a form which may be used by the user device 196, such as a television or computer.

In particular, the set top box 190 includes a front end tuner 172 for tuning a desired frequency band or channel. In a selected embodiment, the tuner 172 also downconverts the IF signal in the selected frequency band to a baseband signal by mixing the IF signal with a local oscillator (LO). The baseband signal from the tuner 172 can be coupled to a receiver 173 which includes a demodulator 174 to demodulate the baseband signal. The demodulator 174 may be configured to operate with a variety of signal modulation schemes. By way of example, exemplary embodiments of the demodulator 174 may support BPSK (Binary Phase Shift Keying), QPSK (Quadrature Phase Shift Keying), 8 PSK (Eight Phase Shift Keying), 16 QAM (Quadrature Amplitude Modulation), Frequency Shift Keying (FSK), and numerous other modulation schemes known in the art. The demodulator 174 can support a fixed modulation scheme or, alternatively, be adaptively switched between any number of modulation schemes to best accommodate changing environmental conditions and other system parameters.

The modulation scheme supported by the demodulator 174 may be controlled by a processor 178. The processor 178 may cooperate with the demodulator 174 to determine the type of modulation present. By way of example, the processor 178 may program the demodulator 174 to sequentially cycle through a number of different modulation schemes to find the appropriate one. Alternately, the processor 178 may be programmed with the modulation scheme associated with a particular frequency band. With this approach, if the processor 178 also controls the tuner 172, the processor 178 can readily set the demodulator 174 appropriately based on the tuner frequency. As will be described in greater detail below, the processor 178 can also cooperate with the demodulator 174 to facilitate channel acquisition and tracking.

The demodulated baseband signal from the demodulator 174 can be coupled to a forward error correction (FEC) block 176. The FEC block 176 may be implemented in a variety of ways and employ any number of coding algorithms, depending upon the overall design constraints of the communications system and the specific application. The processor 178 can be used to select the appropriate coding algorithm. In a selected exemplary satellite communications system, parallel or serial concatenated codes may be used. Concatenated codes provide a robust methodology for correcting data corrupted by noise, interference, and other environmental conditions due to its ability to operate at lower signal-to-noise ratios than may be possible with other coding algorithms.

The demodulated, error corrected output from the receiver 173 is delivered to a High Definition (HD) decoder 181. The receiver 173 output can be a standard MPEG-2 (Motion Picture Experts Group) format, or any other format known in the art. In the MPEG-2 format, the output of the receiver 173 can be a serial or parallel transport stream. Alternatively, the receiver 173 can deliver both a parallel and serial MPEG-2 transport stream to the HD Decoder 181. An exemplary HD Decoder is disclosed in U.S. application Ser. No. 09/641,734, filed Aug. 18, 2000, entitled "Video, Audio, and Graphics Decode, Composite and Display System," commonly owned by the Assignee of the present invention, the entire disclosure of which is expressly incorporated herein by reference.

The HD Decoder 181 may include a transport stream decode processor 180 for extracting, demultiplexing and otherwise converting a serial transport stream of video, audio and data into a parallel transport stream. The parallel transport stream from the transport processor 180 may be coupled to a video decoder 182 and audio decoder 186, where the video decoder 182 decodes the video signal elementary stream and outputs a decompressed video signal, and the audio decoder 186 decodes the audio signal elementary stream and outputs a decompressed audio signal. Alternatively, the video and audio decoders may be implemented as an MPEG-2 decoder that recreates video, audio and data streams using MPEG-2 decoder algorithms well known in the art. The output of the video decoder 182 can be coupled to an NTSC (National Television Standards Committee) encoder for conversion to an NTSC format, or to a PAL, HDTV or SECAM encoder, depending upon the video format required. Video standards such as NTSC, PAL, HDTV and SECAM specify line and field rates and include color information encoding for a television receiver. The decompressed audio and video signals are converted analog signals by Video DAC 184 and Audio DAC 188.

As illustrated in FIG. 1, a data stream that is transmitted over the transmission channel 165 may be divided into a series of successive concatenated frames 13, 17, 21, each formatted to include a header portion (e.g., header 12) followed by a data payload portion (e.g., data 14). Coupling a header 12 along with data 14 in a discrete frame 13 may provide particular advantages. For example, the frame 13 may have a different modulation scheme than a successive frame 17. Frame 13 may contain QPSK symbols and frame 17 may contain 8 PSK symbols, and each frame may be intended for different receivers. Additionally a different format can be used for the header and the data, for example a QPSK header may be used with 8 PSK data. The header may be encoded so as to indicate the format of the data within the block, or of future blocks. As will be appreciated, each frame may be formatted as a plurality of symbols, including a preamble group of one or more symbols, a header group of one or more symbols and/or a data group of one or more symbols. For example, with the Orthogonal Frequency Division Multiplexing (OFDM) based wireless LAN (WLAN) defined in WLAN 802.11, the preamble or header groups may contain a training sequence of symbols (which is typically a predetermined symbol pattern) to assist the receiver in synchronizing to the transmitted signal, while the data group contains a variable number of symbols. Different data partitioning formats may also be used with each frame when each frame is intended for different users and hence may have different types of modulation and data formats in successive data frames. By using such a flexible scheme for data delivery, a variety of user needs can be accommodated.

In an exemplary embodiment of the present invention, header symbols in a received data stream are identified and acquired. Once acquired, the header symbols may be used to determine any frequency offset of the communications channel carrier frequency. One method for determining the carrier frequency offset at the receiver system is to mix the incoming signal with series of frequencies one at a time until the correct frequency is found. By mixing the incoming signal across a series of frequencies and correlating the resultant signal (for example a resulting baseband signal), the actual center frequency of the incoming signal can be determined. Mixing the incoming signal with a series of frequencies, however, can take considerable amount of time. The number of frequency offsets that may have to be applied to the incoming signal, before the correct frequency offset is found, can be considerable. It is desirable to be able to determine the offset of the center frequency without going through a process of trial and error, incrementing the mixing frequency and using the incremented frequency to mix with the incoming signal.

Figure 2:
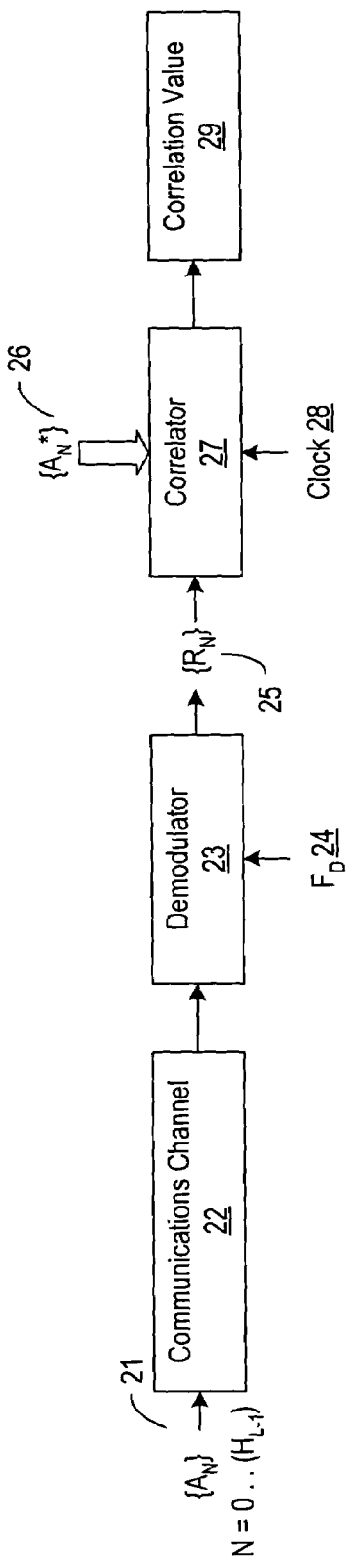
FIG. 2 is graphical illustration of a mechanism that may be used to search for given sequence of symbols, such as those found in a header.

FIG. 2 is a graphical illustration of a mechanism in the receiver system that may be used to search for a given sequence of symbols, such as a series of training symbols found in a header. As illustrated, a sequence of symbols 21 being transmitted through a communications channel 22 is represented by $\{A_N\}$ which contains a number of training or header symbols $H_L$ which is equal to the header length. Thus, $A_N$ includes a sequence of header symbols for N=0 to N=($H_L$-1). The training or header symbols in the sequence of symbols 21 are known symbols which a receiver system may look for in order to synchronize or lock onto a received transmission. The symbols $A_N$ (including header symbols) transmitted through the communications channel 22 are received by a receiver system at the demodulator 23. The demodulation frequency $F_D$ 24 is also coupled into the demodulator 23, and may be adjustably mixed with the incoming signal to translate the incoming data symbol stream from the communications channel 22 into a baseband sequence of received symbols 25, represented by $\{R_N\}$. By virtue of transmission over the noisy communications channel, the received symbols 25 will likely have noise and/or distortion added to them. The baseband symbol stream $R_N$ 25 is coupled into a correlator 27 which searches for a match between the known and locally-stored header sequence $A_N^*$ 26 and the received symbols $R_N$ 25. The correlator 27 is clocked by a clock 28 which controls the comparison between the known header sequence $A_N^*$ 26 and the received symbol stream $R_N$ 25. The comparison of $A_N^*$ 26 and $R_N$ 25 within the correlator 27 may be implemented in real time as a bit-by-bit or symbol-by-symbol comparison, or may be implemented by comparing a plurality of buffered bits or symbols. In the correlator 27, the symbols or bits that match each other are typically added to produce a correlator value 29. As will be appreciated, a higher correlator value indicates a better match.

The foregoing correlation process can be used to identify and acquire the location of a header or training symbol sequence in the received symbol $R_N$ data stream 25. For example, by sweeping a received symbol stream $R_N$ 25 through the correlator, a known and locally-stored header symbol sequence is effectively compared to each possible header symbol sequence in the received symbol stream $R_N$ 25 using a comparison window, with each comparison being quantified by the correlator value 29 and its associated timing address. Once the comparison window has swept across the received symbol stream $R_N$ 25, the correct header location can be ascertained by observing which timing address has the highest correlator value.

As will be appreciated by persons of ordinary skill in the art, any transmitted header symbols received by a receiver system will have had noise and/or distortion added to them as a consequence of transmission through the communications channel. As a result, for a given frequency offset between the transmitted and received signals, the length of the symbol sequence determines how large of a frequency offset can be tolerated and still form a proper correlation. The longer the sequence of symbols that are being detected in a correlator, the less frequency offset that can be tolerated in the center frequency. Therefore, in order to tolerate a large frequency offset, a short sequence is desirable. On the other hand, a long sequence will result in more gain when correlated with the sequence to be detected. Conventional solutions have been unable to provide both good correlator gain and large frequency offset tolerance.

Figure 3:
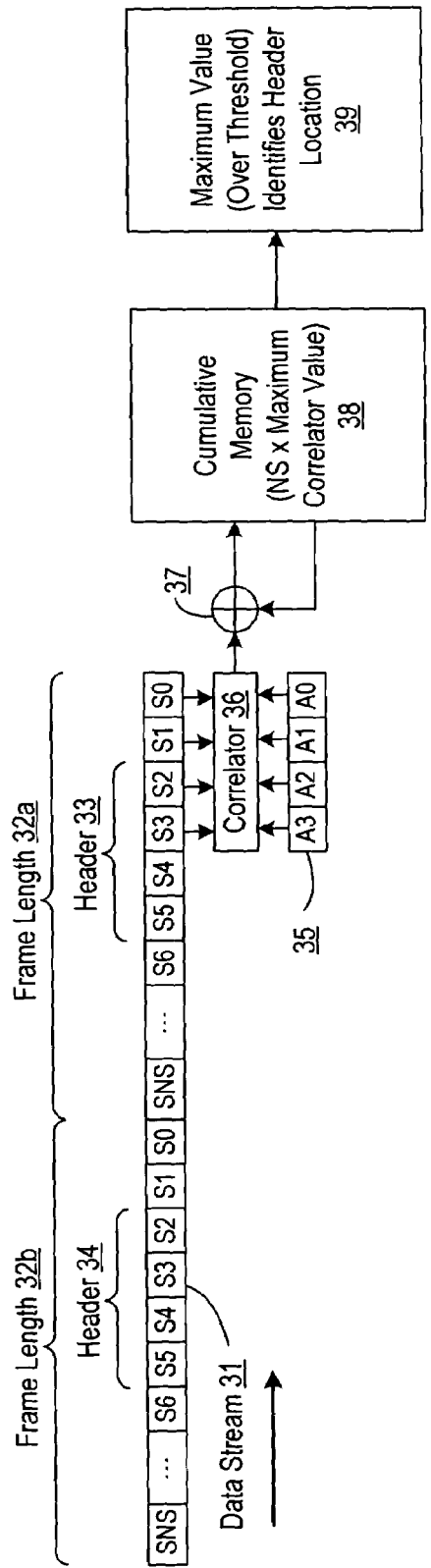
FIG. 3 illustrates a simplified schematic diagram of an exemplary cumulative header acquisition architecture in accordance with various embodiments of the present invention.

FIG. 3 illustrates a simplified schematic diagram of an exemplary cumulative header acquisition architecture in accordance with various embodiments of the present invention which may be implemented in software under control of a receiver processor, in hardware or in a combination of hardware and software. With the disclosed architecture, a data stream 31 is received that includes a plurality of symbols organized into a plurality of symbol frames having frames lengths 32a, 32b, each including a plurality of symbols S0-SNS. For each frame length, the symbol sequence 31 is passed symbol-by-symbol through a correlator 36 to generate NS correlator values, where each correlator value indicates the level of correlation between the locally-stored training sequence 35 and whichever symbols from the symbol sequence are aligned with the correlator 36. By storing the first predetermined set of correlator values from the first frame 32a in the memory 38, and using a sum circuit 37 to accumulate a second predetermined set of correlator values from a successive frame (e.g., 32b), a cumulative pattern of correlator values may be constructed in the cumulative memory 38 over a plurality of frame lengths. Once the correlator values for a predetermined plurality of frame lengths have been accumulated in the cumulative memory 38, the location of the header symbols may be output as a peak value 39 by identifying the location of the largest correlator value in the cumulative memory 38. This results from the fact that the header or training symbol sequences 33, 34 contained in the data stream 31 are repeated within each frame length, while the remaining symbols in the frame lengths will appear randomly.

In particular and as illustrated in FIG. 3, when the first frame length 32a is first applied to the correlator 36, the symbols {A3, A2, A1, A0} from the locally-stored training sequence 35 may not correlate with the first symbols {S3, S2, S1, S0} from the data stream 31. This results in a lower correlator value being generated by the correlator 36 and stored in the first symbol position of the memory 38. However, as the symbols of the data stream 31 shift through the correlator 36, the data stream symbols {S5, S4, S3, S2} corresponding to the header symbols 33 in the first frame length 32a shift into the correlator 36, resulting in a higher correlator value being generated by the correlator 36 and stored in the corresponding symbol position of the memory 38. Of course, as the symbols of the data stream 31 continue shifting through the correlator 36, the data stream symbols {S5, S4, S3, S2} corresponding to the header symbols 33 in the first frame length 32a shift out of the correlator 36, resulting in a lower correlator value being generated by the correlator 36 and stored in the corresponding symbol position of the memory 38. Because the presence of noise from the communications channel may diminish the correlator value generated for the actual header symbols 33 or increase the correlator value generated for non-header symbols, the foregoing process is repeated with one or more additional frame lengths (e.g., 32b). By repeating this process and accumulating the resulting correlations values in the cumulative memory 38, the correlator values for the actual header symbols 33, 34 are built up in relation to the remaining symbols which appear otherwise random in relation to the header symbols. When the process has been repeated for a predetermined number of frame lengths, the header location in the frame is determined by identifying the largest or peak correlator value contained in the cumulative memory 38. In the example depicted in FIG. 3, the largest or peak correlator value contained in the cumulative memory 38 should correspond to the third symbol position (S2).

As an additional safeguard against the deleterious effects of channel noise, a predetermined threshold requirement may be applied when evaluating whether the largest correlator value in the cumulative memory is a peak. For example, if the largest correlator value in the memory 38 does not exceed a threshold percentage (e.g., seventy percent) of the maximum possible correlator value for a given header symbol sequence, then the largest correlator value in the cumulative memory 38 is not treated as a peak, and the process is restarted anew. In a selected embodiment, a receiver processor applies the threshold to identify the peak address by identifying a timing address in the cumulative memory having the highest correlator value that exceeds a predetermined threshold requirement, thereby preventing channel noise events from being identified as a peak correlator value. If the threshold percentage is too low (e.g., 50%), then noise events will be more likely to be treated as peaks, but if the threshold percentage is too high (e.g., 80%), then legitimate header symbol correlator values will be ignored.

As will be appreciated, the methodology described with reference to FIG. 3 requires a cumulative memory 38 that is large enough to store the range of correlator values for each of NS symbol positions. This results from the fact that the correlator 36 steps through the entire frame length (e.g., 32a) one symbol at a time so that, for each symbol group aligned with the correlator 36, a correlator value is calculated and stored. In communication systems (such as satellite communications or 802.11 protocols), a frame may include thousands of symbols (e.g., 21,690 symbols are permitted by DVB-S2 standard), resulting in the cumulative memory size (e.g., 21 KB or larger) that is difficult to integrate with other communication system components in a single chip receiver. In addition, the size of the cumulative memory 38 increases as the number of frames L being accumulated increases since the memory must be able to store a cumulative correlator value for however many frames are accumulated. Thus, for data frames having 64 header symbols, two frame accumulation passes require that the cumulative memory include Q bits to represent the maximum possible accumulated correlator value, while four frame accumulation passes require that the cumulative memory include R bits to represent the maximum possible accumulated correlator value, where Q and R are selected to optimize device performance.

To reduce the size of the cumulative memory, a selected embodiment of the present invention provides a selective memory accumulation method and system for use with header acquisition and synchronization. In this embodiment, instead of storing a correlator value for each and every symbol position of the NS symbols in a frame, a preliminary estimate is made of which symbol positions in the data stream should be correlated, so that only the identified symbol positions are used to calculate and accumulate correlator values. An example implementation is shown in FIG. 4 which illustrates a selective memory accumulation approach that may be used in accordance with the present invention.

Figure 4:
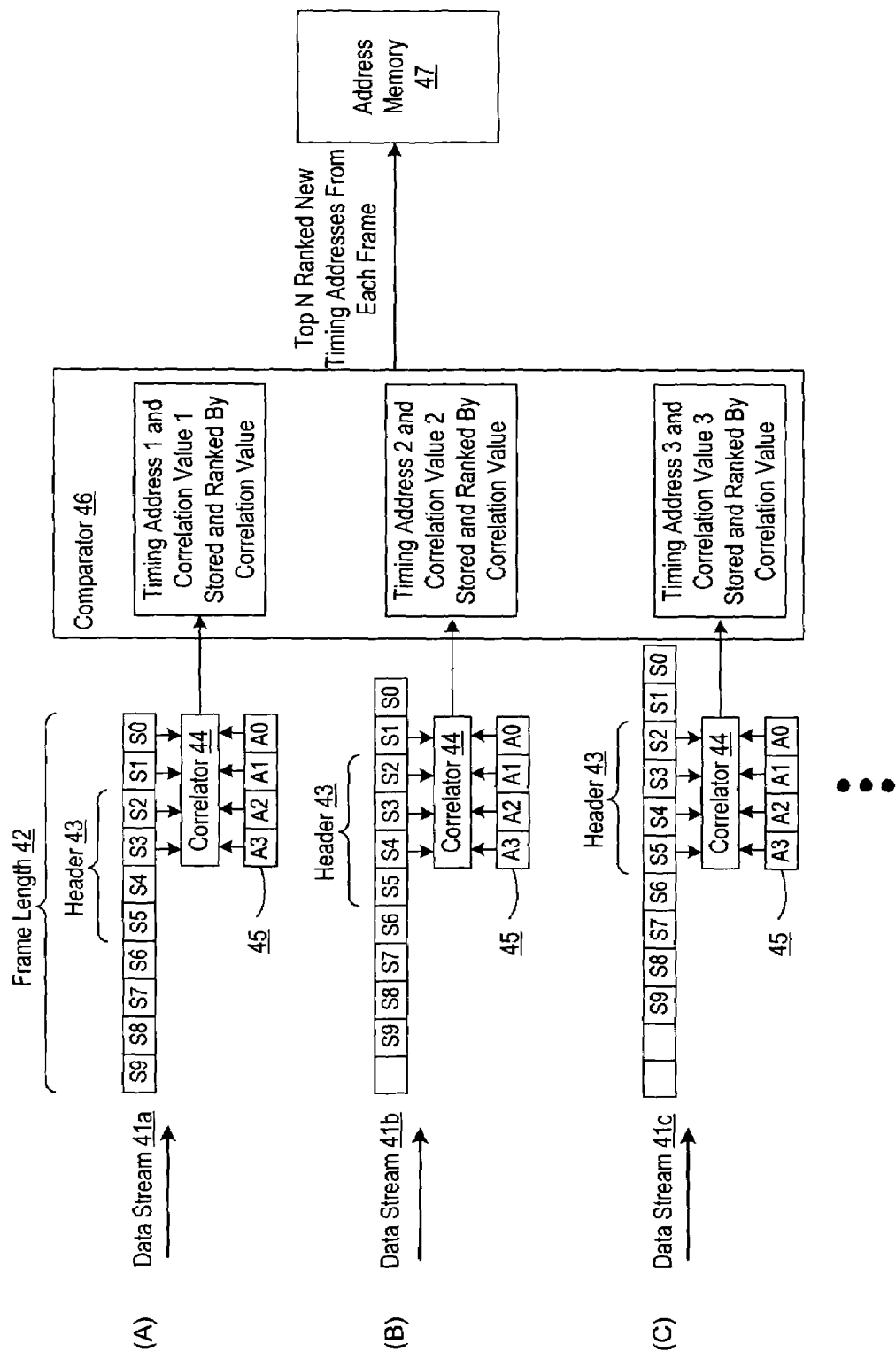
FIG. 4 illustrates a simplified schematic diagram of a selected alternative embodiment for a header acquisition architecture in accordance with various embodiments of the present invention.

In particular, FIG. 4 shows a series of correlation operations (A)-(C) on a data stream 41 that includes a symbol frame 42 with a frame length of received symbols {S0-S9}. Though the simplified data stream depiction shows a frame length of ten symbols in which a four symbol header is located, it will be appreciated, that other symbol counts are contemplated. For example, with satellite transmission schemes, each frame may include a header or training sequence of a predetermined number of known symbols (e.g., 90 symbols), and may also include a data payload portion having a variable number of symbols so that the total frame size may include up to a predetermined number of symbols (e.g., 21,600 symbols).

In the example of FIG. 4, the frame length 42 of received symbols contains header symbols 43 which are the true beginning of a frame. Rather than storing a correlator value for each symbol position in the frame length, a comparator 46 is used to identify and store a predetermined number (N) of the largest correlator values along with a corresponding timing address from each frame length, thereby identifying which symbol positions likely contain the header symbols. The timing addresses for the top ranked correlator values may then be stored in an address memory 47 for use in connection with accumulating correlator values over a plurality of data frames, as described herein.

When the first frame length 42 of the data stream 41a is first applied to the correlator 44, the symbols {A3, A2, A1, A0} from the locally-stored training sequence 45 are compared with the first symbols {S3, S2, S1, S0} from the data stream 41a. Based on this comparison, a first correlator value (Correlator Value 1) is generated by the correlator 44 and sent, along with its timing address (Timing Address 1), to the comparator 46. As the symbols of the data stream 41b shift by one symbol position into the correlator 44, the data stream symbols {S4, S3, S2, S1} are compared by the correlator 44 to the locally-stored training sequence symbols {A3, A2, A1, A0}. The result of this second comparison is that a second correlator value (Correlator Value 2) is generated by the correlator 44 and sent, along with its timing address (Timing Address 2), to the comparator 46. Likewise, as the symbols of the data stream 41c shift by one symbol position into the correlator 44, the data stream symbols {S5, S4, S3, S2} are compared by the correlator 44 to the locally-stored training sequence symbols {A3, A2, A1, A0}, resulting in a third correlator value (Correlator Value 3) being generated by the correlator 44 that is sent, along with its timing address (Timing Address 3), to the comparator 46. As each timing address and corresponding correlator value is received at the comparator 46, the correlator values are used to pick out the top N correlator values (and associated timing addresses) from NS symbols in a frame and to discard the remaining timing addresses. The top N (e.g., 24) ranked timing addresses from a given frame may be stored in an address memory 47 and used to select which correlator values are accumulated in the cumulative memory. Alternatively, additional timing addresses may be collected from other frame lengths using the same process, and the additional timing addresses can be added to the address memory 47, to the extent they are not already stored therein.

When the channel noise is significantly large, the correlator output becomes noisy as well. If the correlator peak can not be distinguished from large noise peaks, successful header acquisition may not be achieved within a required time frame. One solution is to increase the header length, or the number of the symbols in a header. When the header length is double, the performance will be improved by 3 dB. In other words, if a given algorithm works in a 0 dB SNR environment, the algorithm can work under −3 dB SNR by doubling the header length. However, when the header length is defined as a fixed length by industry standards, this solution is not viable. Accordingly, a selected embodiment of the present invention addresses this by accumulating the correlation values over multiple frames. The resulting operation is obtains the performance benefits of increasing the header length to combat the noisy environment, but without actually increasing the header length.

Figure 5:
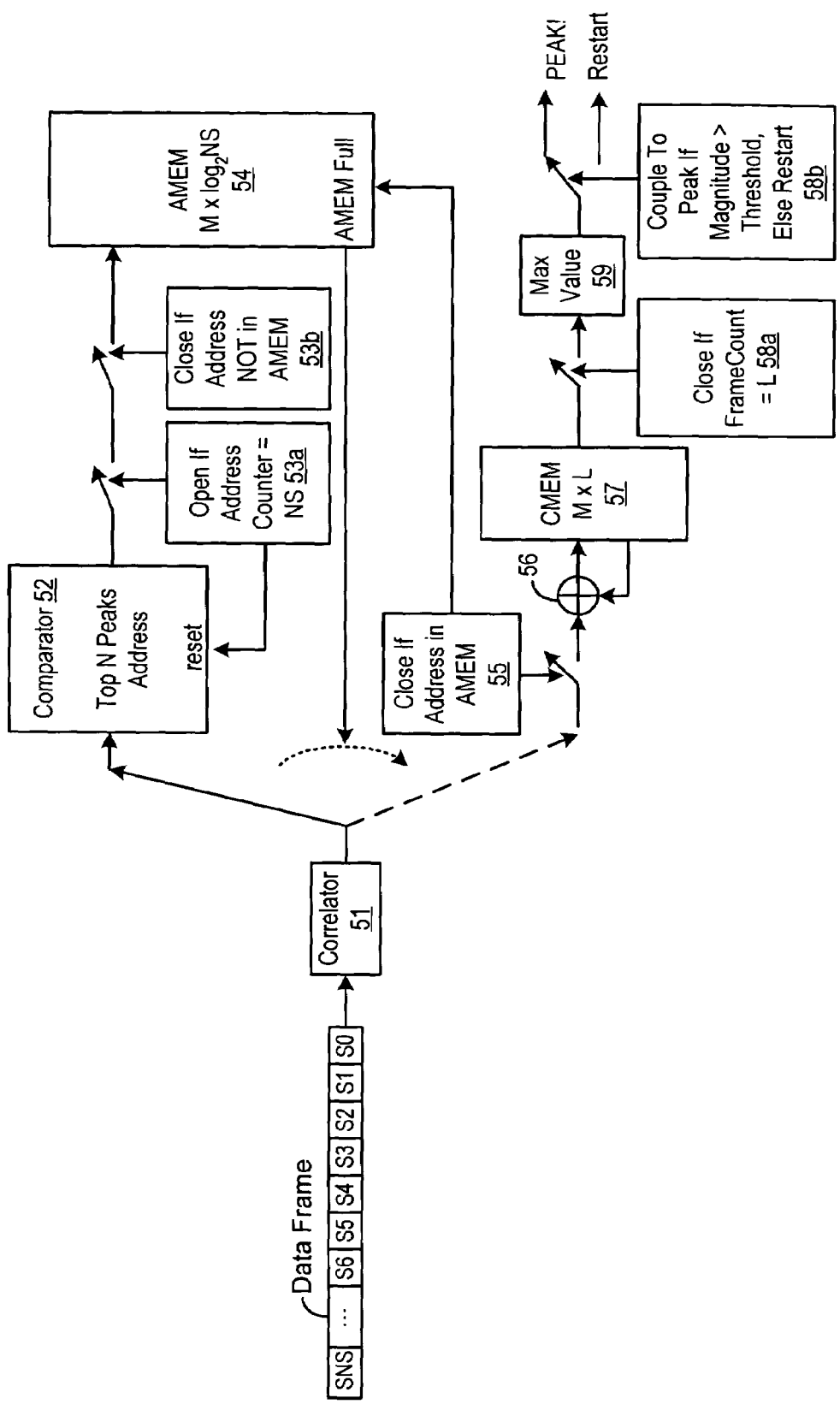
FIG. 5 illustrates an exemplary header acquisition system and methodology in accordance with various embodiments of the present invention.

While the header symbol location may be identified by accumulating and storing all correlator values over a number of frames, such an approach requires a large memory. For example, if the number of symbols of a frame is 21,600, and the correlator value needs 16-bit precision, then the memory will have to be able to store 21,600×16=42 Kbyte. Some systems will be able to include such a memory, but it can be very expensive to integrate a 42 Kbyte RAM based memory (or higher, depending on the frame size) in other systems (e.g., especially with ASIC designs). Accordingly, a selected embodiment of the present invention reduces the size of the accumulator memory in order to reduce the cost in exchange for the trade off of increasing the header acquisition time. Turning now to FIG. 5, an exemplary multi-stage header acquisition system and methodology is illustrated in accordance with various embodiments of the present invention. In the first stage, the true beginning timing of a data frame {S0-SNS} is identified by using a real-time correlator 51 followed by a comparator 52 to pick out the top N correlator values from NS correlator values of NS symbols in a frame duration.

The correlator 51 may be implemented sequentially or in parallel to provide a comparison function between a first symbol sequence from the data symbol stream and a second training symbol sequence that corresponds to a predetermined header symbol sequence and that is locally stored in a storage medium, memory or buffer. However, in a selected embodiment, the correlator 51 may be implemented as a real-time correlator for correlating a first symbol sequence with a second locally stored training symbol sequence by sequentially convolving the first symbol sequence with the second training symbol sequence to produce a plurality of sequential convolved values. The sequential convolved values may then be added or accumulated to generate a correlator value.

The comparator 52 generates the top N correlator values from the NS correlator values of a data frame duration, and couples the timing address of the top N correlator values to the address memory 54 (AMEM) only when the address counter indicates that NS symbols have been processed by the comparator 52 (coupling condition 53a). In this way, the address memory 54 of size M may be used to memorize M timing addresses provided by the comparator 52, where M≧N. In a selected embodiment, the top N addresses from a data frame are stored in the address memory 54. In addition or in the alternative, successive data frames are processed by the correlator 51 and comparator 52 to identify the top N timing addresses from each frame, and these timing addresses are stored in the address memory 54 until the memory is full. This may be implemented by comparing each timing address generated by the comparator 52 with the existing addresses inside the memory 54, and recording the generated timing address only if it is a new address (coupling condition 53b). The system stays in this operation until the address memory 54 is full.

Once the address memory 54 is full, the procedure switches to a second stage, where correlator values for the selected timing addresses are accumulated. In this mode, a feedback summing device 56 and cumulative memory 57 are used to accumulate the correlator values generated by the correlator 51 for each address in the address memory 54 (coupling condition 55) for a predetermined number of frames (L). Once the correlator values for the timing addresses in address memory 54 are accumulated over L frames (coupling condition 58a), the largest value among the accumulated correlator values in the cumulative memory 57 is determined or buffered (buffer 59). In a selected embodiment, the largest accumulated correlator value is compared with a threshold (coupling condition 58b) for purposes of preventing noise events from being treated as peak values. If the largest accumulated correlator value is larger than the threshold, it will be declared as a peak and the address associated therewith is the peak timing, i.e. the identified timing of the start symbol of a frame. However, if the largest accumulated correlator value is lower than the threshold, the acquisition process will be reset and start all over again.

After the second accumulation stage of operation, a third stage may be used to confirm the header acquisition result whereby the receiver or FEC modules process the identified peak timing address to confirm header acquisition at the peak address by attempting to lock onto the header at the indicated timing. The acquisition process will be reset if the receiver or FEC signals that there is "no lock" after a predetermined time elapses.

As will be appreciated, the various parameters (N, M, L, threshold) are variable and may optionally be implemented as programmable parameters to achieve optimum performance. In a selected implementation involving data frames with 64-symbol headers, N=24 correlator values are selected by the comparator from each frame during the first stage. In addition, M=256 timing addresses are stored fully in the address memory during the first stage over the course of a predetermined number of frames (e.g., approximately 12 frames to 15 frames). During the second stage, the accumulation operations may be performed over a plurality of frames (e.g., of L=20 frames), where the frame count L may be increased as the SNR worsens. For example, if the SNR=−5 dB, the correlator values may be accumulated over ten frames, but if the SNR=−10 dB, the correlator values may be accumulated over twenty symbol frames to achieve reliable header acquisition. As for the application of the threshold variable, only accumulated correlator values exceeding 70% of the maximum possible accumulated peak value are declared as true peak values, though empirical analysis may indicate that the threshold value be adjusted upward or downward. By using the first stage to selectively identify timing addresses, these exemplary parameter values allow a 1 KB cumulative memory to replace a 21 KB cumulative memory that would be required if the first stage were not used while still achieving header acquisition within the desired time.

The techniques described herein may be used to quickly and efficiently generate a peak address that may be used for header acquisition, though it will be appreciated that there is a tradeoff between acquisition speed and accuracy. For example, header acquisition accuracy should improve with a larger frame count L over which correlator values are accumulated; however, an increase in the frame count will slow down the acquisition speed. One possible benefit of using the efficient header acquisition techniques of the present invention is that, if a first peak address calculation is incorrect, the header acquisition process may be restarted to re-calculate a peak address. For example, with transmission specifications that require acquisition within one second, the cumulative header acquisition process of the present invention that requires ten milliseconds may be run 100 times within the acquisition specification. Likewise, the cumulative header acquisition process of the present invention that requires 100 milliseconds may be run 10 times within the acquisition specification. As a result, the present invention permits recovery from any error in the initial peak address determination by restarting the header acquisition process to determine a new peak address.

By accumulating correlator values from the data stream over a plurality of frames, header symbols may be quickly identified and acquired using a real-time correlator in a noisy environment, even when the correlator output would be relatively weak if used with only a single frame. Where the header acquisition process disclosed herein is implemented in software, costly hardware implementations of a header acquisition algorithm may be avoided by using software-based header acquisition techniques described herein which achieve superior performance without a significant increase in hardware cost. In particular, the disclosed cumulative header acquisition techniques may be used to quickly achieve header acquisition with large frames using smaller header symbol counts in very low SNR environments. Because the disclosed header acquisition architecture can achieve substantial acquisition improvement with shorter headers, more efficient bandwidth utilization is obtained. In addition, by selectively identifying timing address locations in the frames where the accumulation operations are focused, a smaller memory may be used for the cumulative memory. This is particularly advantageous for applications on ASIC designs.

Figure 6:
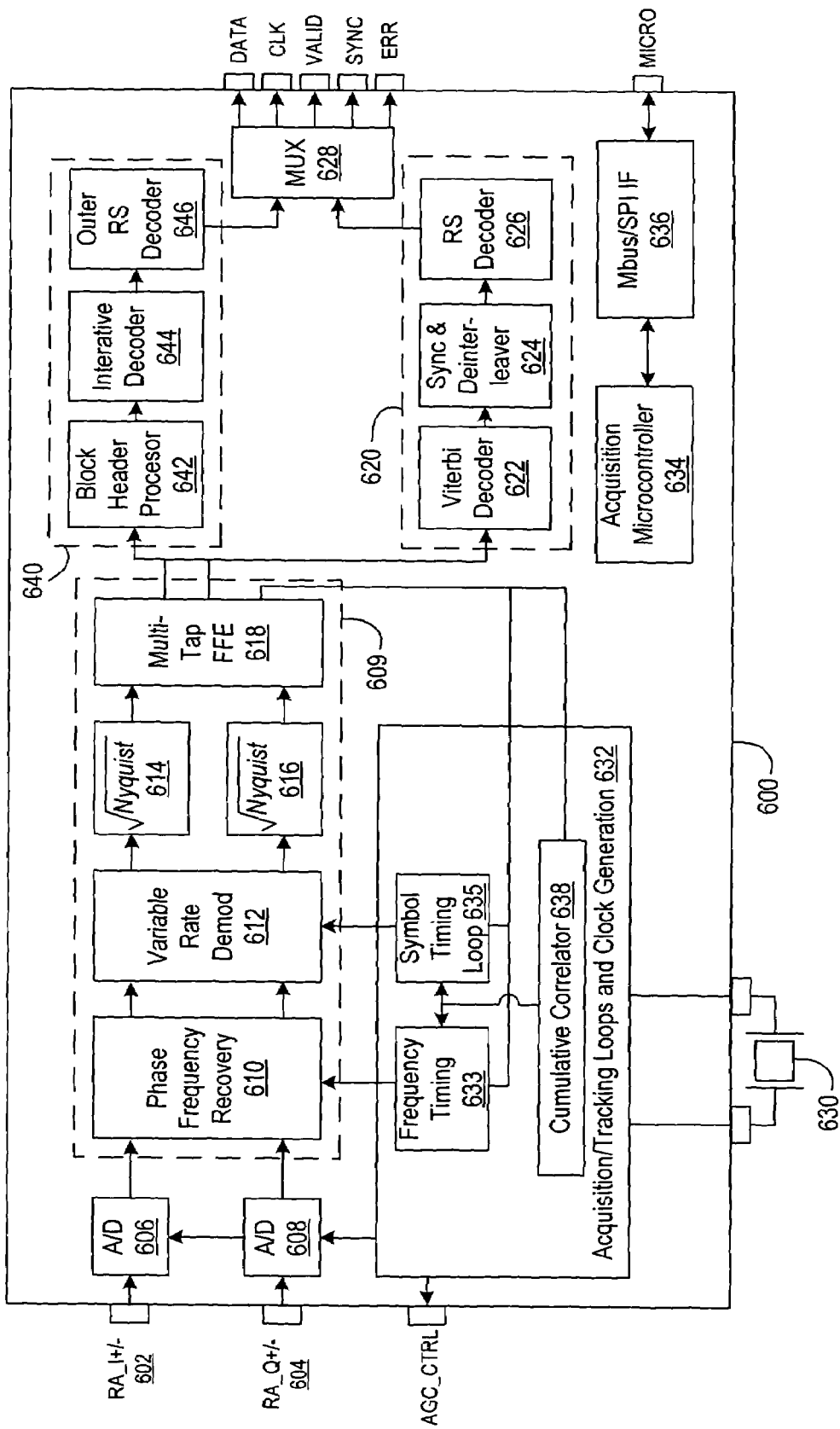
FIG. 6 illustrates a simplified functional block diagram of a receiver system.

FIG. 6 illustrates an embodiment of the receiver 173 depicted in FIG. 1, where receiver 600 may be implemented in integrated circuit form to demodulate and convert transmitted signals into a digital data stream that is provided to transport processor 180. As shown, each integrated receiver accepts a modulated data stream 602, 604. In a selected embodiment, the modulated data stream is serial satellite data delivered at up to 90 Mbps. The receiver 600 delivers a demodulated, error-corrected output data stream (DATA).

Each integrated receiver 600 includes an analog front end for digitizing the input signals, such as output from the tuner 172 shown in FIG. 1. In one embodiment, dual A/D converters 606, 608 accept analog baseband I and Q input signals, and sample these signals to produce digital I and Q data with zero DC bias. The output from the analog front end is provided to demodulator 609. As illustrated in FIG. 6, demodulator 609 includes phase/frequency recovery circuit module 610, dual variable rate digital filters 612, dual square root Nyquist matched filters 614, 616, and an equalizer 618. The phase and frequency of the sampled waveform is recovered by the phase/frequency recovery module 610 which removes residual phase and frequency offsets in the baseband signal. In addition, the phase/frequency recovery circuit module 610 tracks changes in frequency and phase due to local oscillator drift in the tuner and LNB. The variable rate digital filters 612 in receiver 600 operate under the control of the symbol timing recovery loop to re-sample the input data at the correct frequency and phase to ensure that ideally sampled symbols are input to the matched filters 614, 616. These filters 614, 616 consist of dual square root Nyquist filters. Optimized soft decisions are then fed into either a FEC decoder 620 or a turbo decoder 640 by a multi-tap FFE unit 618. The FEC decoder 620 performs error correction using a Viterbi decoder 622, a synchronization and deinterleaver 624, and an RS decoder 626. In a selected embodiment, the FEC decoder 620 complies with the DVB, DirecTV, and Digicipher II error correction and framing schemes for satellite transmissions. The turbo decoder 640 includes a block header processor 642, an iterative decoder 644, and a Reed-Solomon (RS) decoder 646, as shown. The error corrected output is delivered in MPEG or DIRECTV transport format through the multiplexor 628.

The receiver 600 also includes a simplified user interface including a microcontroller 634 for system configuration, acquisition, control, and monitoring functions. System interface to the receiver 600 may be accomplished through a simplified high-level application programmer interface (API) 636.

As illustrated in FIG. 6, an off-chip crystal oscillator 630 is used as a reference to generate required clock frequencies for the receiver 600. The timing for the analog front end 606, 608 and demodulator 609 is provided by PLL and clock generator 632. The clock generator unit 632 also performs the acquisition and tracking loops functions for the blocks 610 and 612 under control of a receiver processor, which may be located in or communicatively coupled to the receiver 600. When the system is initially turned on, both the frequency loop 633 and the symbol timing loop 635 are disabled by the receiver processor. Under control of the receiver processor, the cumulative correlator 638 then examines the incoming symbols provided by the demodulator and estimates the location of the header sequence using the comparator and address memory, as previously described. Once the receiver processor and cumulative correlator 638 have estimated the location of the header symbols and accumulated correlator values at the estimated locations over a plurality of L frames, a peak value is declared and the corresponding timing address is used to locate the header symbols. With this header location, the difference between the carrier frequency and the receiver clock frequency (e.g., the value of the offset between the transmitter frequency and the receiver frequency) can be inserted, as a starting value, into the frequency loop 633. Once the offset frequency has been loaded into the frequency loop by the receiver processor, the receiver processor may then enable the loop. The frequency loop can then quickly lock in and track the carrier frequency.

In similar fashion, the header acquisition process may also be used to estimate the phase offset within the symbol timing loop 635. Once the receiver processor and cumulative correlator 638 have estimated the location of the header symbols and accumulated correlator values at the estimated locations over a plurality of L frames, a peak value is declared and the corresponding timing address is used to locate the header symbols. With this header location, the phase offset in the symbol timing loop is determined and inserted into the symbol timing loop 635. When the receiver processor couples the phase offset into the symbol timing loop 635, the receiver processor may enable the symbol timing loop 635. By quickly locking onto the location of the header symbols in the data stream, the acquisition time of the frequency loop 633 is decreased over a conventional type methodology. Similarly, the tracking function within the symbol timing loop can lock to the symbol stream much faster with the cumulative correlator approach.

In a single chip integrated circuit embodiment of the present invention, a satellite receiver 600 is disclosed for demodulating received IQ signals 602, 604, where the receiver 600 may be integrated separately or as part of a single chip set-top box fabricated with CMOS technology. In the integrated circuit implementation(s), the present invention reduces board level components, thereby reducing costs and improving performance over prior art approaches. Thus, the present invention shows, for the first time, a fully integrated digital satellite receiver 600 using a cumulative correlator to perform header acquisition that may be implemented in CMOS.

The various illustrative logical blocks, modules, and circuits described in connection with the embodiments disclosed herein may be implemented or performed in a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A communication receiver, comprising:
   a demodulator that demodulates a received signal to generate a data symbol stream having a plurality of symbol frames, wherein each symbol frame has a plurality of symbols; and
   a processor coupled to the demodulator to identify a header sequence of symbols in a symbol frame of the data symbol stream by applying sequentially a predetermined number of symbols to a correlator to generate a correlator value for each set of symbols by correlating each set of symbols to a known header sequence of symbols, in which the processor is to compare and select N number of highest correlator values from the correlator values generated for a symbol frame, where N is greater than one, and in which timing addresses corresponding to the N number of the highest correlator values are to be stored in a first memory, instead of storing all the correlator values, and subsequently using the timing addresses stored in the first memory to select corresponding highest correlator values for L number of symbol frames, where L is greater than one, that correspond to the timing addresses stored in the first memory, accumulate and store corresponding highest correlator values for the L number of symbol frames in a second memory and to identify a largest accumulated highest correlator value stored in the second memory to determine location of the header sequence of symbols within each symbol frame for the plurality of symbol frames.

2. The communication receiver of claim 1, wherein the processor operates to perform an accumulation operation on the correlator values based on the timing addresses stored in the first memory only after the first memory is full.

3. The communication receiver of claim 1, wherein the processor identifies the header sequence of symbols only when the largest accumulated correlator value exceeds a predetermined threshold value.

4. The communication receiver of claim 1, wherein the processor includes a real-time correlator for correlating each set of symbols.

5. The communication receiver of claim 1, wherein the header sequence of symbols is obtained from a training symbol sequence.

6. The communication receiver of claim 1, wherein the demodulator and the processor are formed together on a common integrated circuit.

7. A method of identifying a location of a header sequence of symbols in a data symbol stream, comprising:
   demodulating, in a demodulator, a received signal to generate the data symbol stream having a plurality of symbol frames, wherein each symbol frame has a plurality of symbols;
   applying sequentially a predetermined number of symbols for correlation for each symbol frame;
   correlating, in a correlator, each set of symbols to a known header sequence of symbols to generate a correlator value for each set of symbols;
   comparing the correlator values to select N number of highest correlator values and corresponding timing addresses for a symbol frame, where N is greater than one;
   storing the corresponding timing addresses of the N number of highest correlator values in a first memory, instead of storing all the correlator values;
   using subsequently the stored timing addresses stored in the first memory to select corresponding highest correlator values for L number of symbol frames, where L is greater than one, that correspond to the timing addresses stored in the first memory, and accumulate and store corresponding highest correlator values for the L number of symbol frames in a second memory;
   identifying a largest accumulated highest correlator value from the stored accumulated highest correlator values in the second memory; and
   using the largest accumulated highest correlator value to locate the header sequence of symbols within each symbol frame for the plurality of symbol frames.

8. The method of claim 7, wherein using the largest accumulated correlator value to locate the header sequence of symbols further includes using the largest accumulated correlator value only when the largest accumulated correlator value exceeds a predetermined threshold value.

9. The method of claim 8, wherein the method of identifying the location of the header sequence is restarted when the largest accumulated correlator value does not exceed the predetermined threshold value.

10. The method of claim 7, wherein comparing the correlator values includes using a comparator to select the N number of highest correlator values.

11. In a digital receiver, a header acquisition circuit comprising:
   means for demodulating a received signal to generate a data symbol stream having a plurality of symbol frames, wherein each symbol frame has a plurality of symbols;
   means for applying sequentially a predetermined number of symbols for correlation for each symbol frame;
   means for correlating each set of symbols to a known header sequence of symbols to generate a correlator value for each set of symbols;
   means for comparing the correlator values to select N number of highest correlator values and corresponding timing addresses for a symbol frame, where N is greater than one;
   means for storing corresponding timing addresses of the N number of highest correlator values in a first memory, instead of storing all the correlator values;
   means for using subsequently the stored timing addresses stored in the first memory to select corresponding highest correlator values for L number of symbol frames, where L is greater than one, that correspond to the timing addresses stored in the first memory, and accumulate and store corresponding highest correlator values for the L number of symbol frames in a second memory;
   means for identifying a largest accumulated highest correlator value from the stored accumulated highest correlator values in the second memory; and
   means for using the largest accumulated correlator value to locate the header sequence of symbols within each symbol frame for the plurality of symbol frames.

12. The header acquisition circuit of claim 11, wherein the means for using the largest accumulated correlator value to locate the header sequence of symbols further includes using the largest accumulated correlator value only when the largest accumulated correlator value exceeds a predetermined threshold value.

* * * * *